Jan. 13, 1959      H. HEILBRUN      2,867,961
CORN HARVESTING ATTACHMENTS FOR GRAIN COMBINES
Filed July 25, 1957      2 Sheets-Sheet 2

INVENTOR.
Harold Heilbrun
BY
ATTORNEY

United States Patent Office 2,867,961
Patented Jan. 13, 1959

2,867,961

CORN HARVESTING ATTACHMENTS FOR GRAIN COMBINES

Harold Heilbrun, Gering, Nebr.

Application July 25, 1957, Serial No. 674,144

3 Claims. (Cl. 56—119)

This invention relates to an attachment for a grain combine to adapt the combine for harvesting corn. A conventional grain combine is not efficient for use on a corn crop. Many stalks, when cut by the sickle of the combine, fall forwardly or sidewardly so that they pass beneath the sickle bar and do not enter the combine. Also, if the crop has been storm-damaged so that the stalks have been bent and broken, the sickle bar will pass over the bent or broken stalks, leaving the latter and their ears lying upon the field.

The principal object of this invention is to provide stalk-gathering means which can be quickly and easily attached to a conventional combine to precede the sickle and which will act to lift leaning and fallen stalks, and support the stalks in a substantially vertical position so that they may be efficiently cut by the sickle of the combine.

Another object of the invention is to provide means which will catch stalks or ears which may fall forwardly or sidewardly from the sickle bar after being cut, so that they will be swept into the combine without loss or waste.

A futrher object is to provide highly efficient means for attaching and supporting the attachment to any standard combine without placing any strains or stresses on the sickle bar; to provide an attachment which can be adjusted to fit various types of combines; and to provide a corn harvesting attachment for combines which will automatically maintain itself uniformly spaced in close proximity to the ground surface ahead of the sickle bar and which will not interfere in any way with the normal operation of the conventional combine mechanism.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
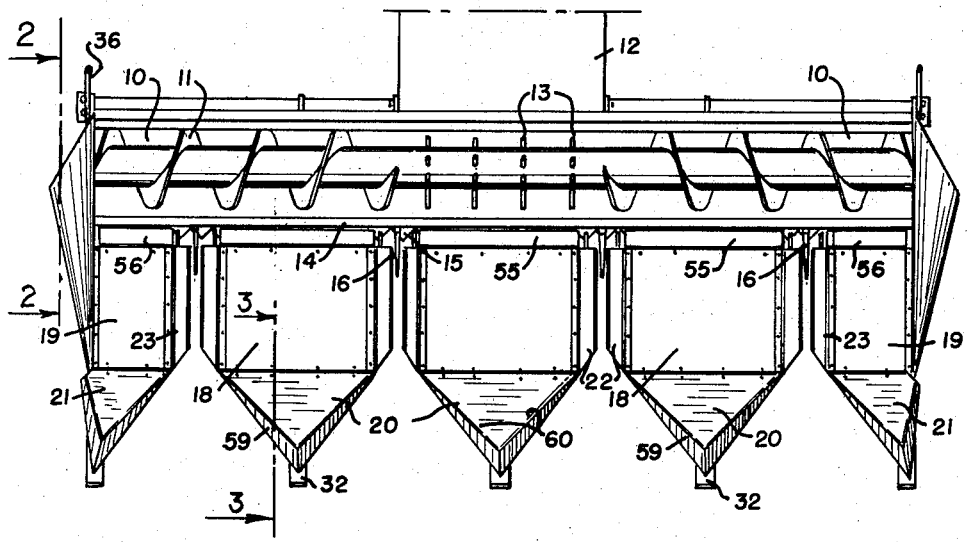
Fig. 1 is a plan view of the improved corn harvesting attachment for grain combines, illustrating it as it would appear in place on a conventional combine.
Figure 2:
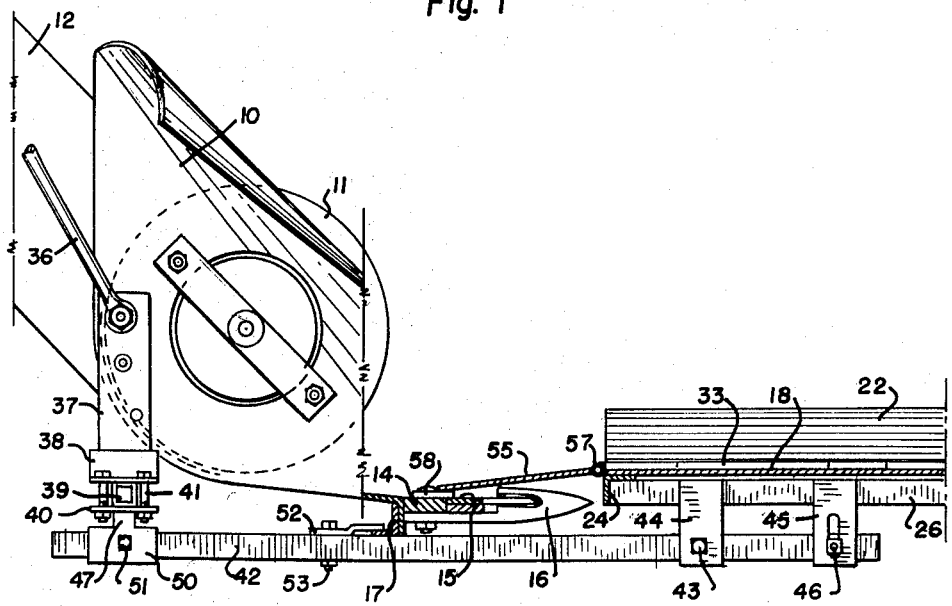
Fig. 2 is an enlarged fragmentary sectional view taken on the line 2—2, Fig. 1.

In Figs. 1 and 2, portions of a conventional grain combine are illustrated and designated by numeral as follows: a multiple row collecting scoop 10, scroll gathering conveyor 11, crop elevator 12, sweep pins 13, sickle bar 14, sickle knife 15, sickle guards 16, scoop supporting angle iron 17, supporting turnbuckle 36, and sickle blade hold down clips 58. The above numbered parts can be found on most, if not all, conventional grain combines. As the combine travels down a plurality of plant rows, the crop is cut by the reciprocating sickle knife 15 and is collected in the scoop 10. The oppositely-acting scroll conveyor 11 conveys the collected crop inwardly from each extremity of the scope 10 toward where it is raked or swept by the sweep pins 13 into the crop elevator 12, which elevates and delivers the crop to the combine for harvesting. As illustrated, the combine is of a size to cut four plant rows simultaneously.

If the conventional combine, as described above, is used to harvest corn, the cut stalks often fall forwardly or sidewardly across or between the rows, so that the sickle bar 14 will pass over the fallen stalks and ears and leave them lying upon the field. It has also been found that ears of corn will be shaken or broken from the stalks as they are cut and will fall to the ground so as to pass beneath the collecting scoop 10 without entering the combine.

Figure 4:
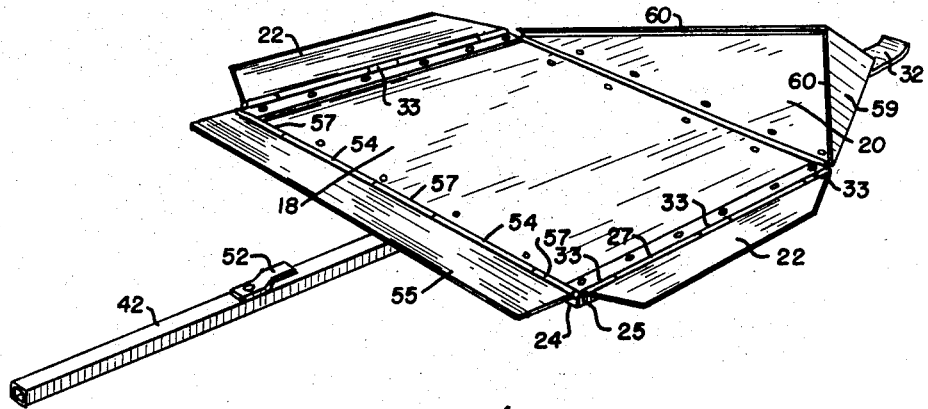
Fig. 4 is a detail perspective view of the improved combine attachment.
Figure 5:
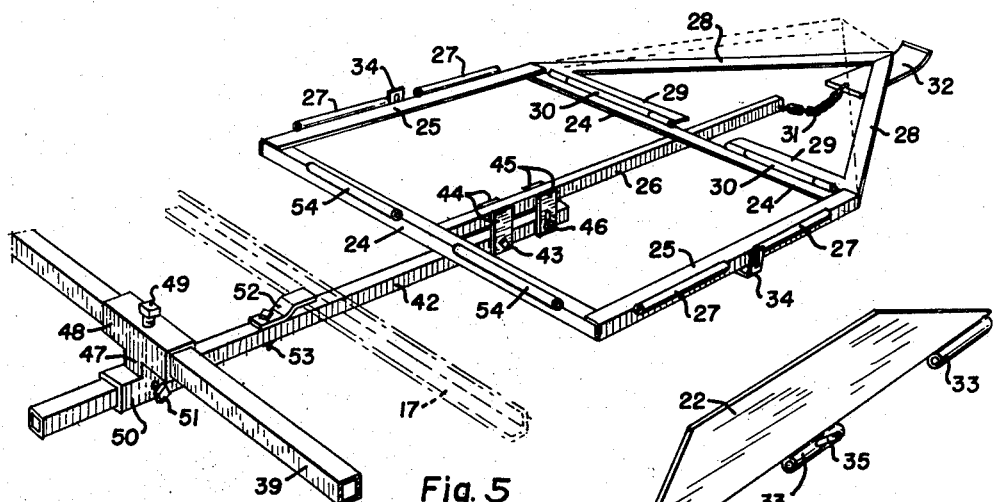
Fig. 5 is a similar detail perspective view illustrating the supporting frame work of the attachment.
Figure 6:
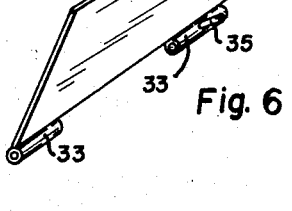
Fig. 6 is a detail perspective view of a crop gathering flop member employed on the improved attachment.

This invention provides a plurality of crop lifting and collecting devices such as illustrated in Fig. 4, designed to be attached to the conventional combine so as to precede the sickle bar 14 and act to gather, straighten and align fallen and bent stalks and guide them between the guards 16 so that they will be efficiently cut by the sickle knife 15 and which will catch and hold all fallen ears so that they will be swept into the scoop 10.

The crop lifting and collecting devices provided by this invention are designed to be positioned between the crop rows. In a four row combine there will be three double sided, intermediate, devices, as illustrated in Fig. 4, and two terminal one-sided devices, each representing one-half of one of the intermediate two-sided devices. Each of the intermediate devices supports a platform plate 18 and each of the terminal devices supports a half platform plate 19 ahead of the sickle knife 15 of the combine. The plates 18 and 19 are supported in separated relation so that they will pass on opposite sides of a row of corn. The intermediate plates 18 are similar in size and contour, and the terminal plates 19 are similar and of opposite hand and each resembles one half of one of the plates 18.

A triangular gathering plate 20 is hinged to and precedes each of the intermediate platform plates 18, and a half-triangular gathering plate 21 precedes each of the half platform plates 19. A side flap member 22 is hingedly mounted on each side edge of each of the platform plates 18, and a similar side flap 23 is hingedly mounted on the inside edge of each of the half platform plates 19. An apron plate 55 is hinged to the rear edge of each platform plate 18 and a similar, shorter apron plate 56 is hinged to the rear edge of each half platform plate 19.

It can be seen that as the combine travels forwardly along the plant rows with this invention in place, the flaps 22 and 23 will move along opposite sides of the rows in contact with the corn stalks to lift and support the latter in proper vertical position for cutting by the sickle bar. Fallen stalks and ears of corn will drop upon the platform plates 18 and 19, the flap members 22 and 23, and the apron plates 55 and 56 and will be swept rearwardly to the collecting scoop 10 of the combine by the oncoming crop as the combine moves forwardly.

This invention relates more particularly to the means for supporting the above described elements and to the means for attaching the supporting means to a conventional combine, so that no weight or strain will be added to the sickle bar or other operating mechanism of the combine.

Each of the intermediate lifting and collecting devices comprises one platform plate 18 riveted or otherwise attached to a peripheral, rectangular, angle-iron platform frame consisting of a forward and a rear transverse angle 24 and two side angles 25 welded or otherwise secured together in rectangular relation in a common horizontal plane.

A medially positioned hollow, square tube 26 extends from the rear transverse angle 24 forwardly through the forward transverse angle 24 and projects forwardly therefrom. The tube 26 is welded or otherwise permanently joined to both the angles 24 so as to form a solid, integral, flat frame for supporting the platform plate 18. Two spaced-apart, hinge tubes 27 are welded to, and extend longitudinally of, each of the side angles 25 in axial alignment with each other. Two hinge tubes 54 are welded to each rear cross angle 24 for hingedly mounting the rear apron plates 55 and 56. The apron plates 55 and 56 are provided with suitable hinge tubes 57 through which a suitable hinge rod is passed to secure them to the tubes 54 of the frame.

Figure 3:
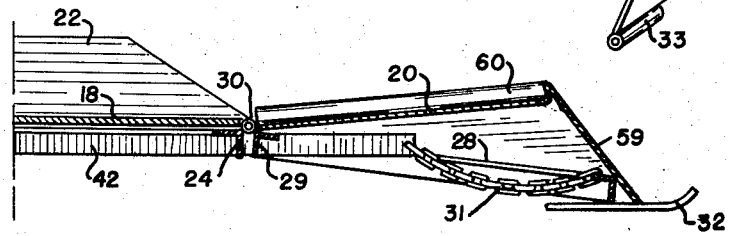
Fig. 3 is a continuation of the sectional view of Fig. 2 along the line 3—3, of Fig. 1.

A triangular, angle iron frame, consisting of two inclined side angles 28 and inwardly extending base angles 29, is hingedly mounted on the forward transverse angle 24 of each platform frame by means of suitable hinges 30. The tube 26 terminates medially within the triangular frame, and the extremity of the latter tube is flexibly secured to the apex of the surrounding triangular frame by means of a suitable flexible member such as a chain 31. A curved runner plate 32 is welded beneath the apex of the side angles 28 and acts to support the triangular frame from the ground. An inclined plow front 59 extends downwardly and forwardly from the two inclined edges of the triangular gathering plate 20. The lower edge of this inclined plow front 59 is riveted, welded, or otherwise secured to the inclined side angles 28 and the rear edge of the inclined plow front 59 is similarly secured to the base angle 29 of the triangular frame so that the triangular gathering plate 20 will normally lie in a rearwardly and downwardly inclined plane when the runner plate 32 is resting on the ground as shown in Fig. 3. A retaining flange 60 is formed along the inclined edges of the triangular plate to retain fallen crop debris thereon.

Each of the side flap members 22 is provided with hinge tubes 33 which align with the hinge tubes 27 on the rectangular platform frame and any suitable hinge rod is passed through the aligned tubes to hingedly mount the flap members 22 on the two sides of the rectangular platform frame.

A slotted angle clip 34 is welded to each of the side angles 25, and a stop pin 35 is welded to the central hinge tube 33 of each flap member. The stop pins project through slotted openings in the angle clips 34 to limit the upward and downward swing of the flap members 22.

Each of the half platform plates 19 is similarly supported by means of frame structure representing one-half of the frame structure above described.

In the usual combine, a turnbuckle plate 37 is externally bolted, welded, or otherwise secured to each end of the scoop 10. In applying this invention to the combine, a short cross angle-iron 38 is welded to the bottom of each turnbuckle plate 37, and a square, transversely extending, hollow attachment tube 39 is clamped to the cross angle 38 by means of a suitable clamp plate 40 and clamp bolts 41. This acts to rigidly support the attachment tube 39 beneath and lengthwise of the scoop 10 rearwardly of the scoop-supporting angle iron 17, and it is from this transverse hollow tube 39 and the supporting angle iron 17 that all of the elements of this improved attachment are supported by means of forwardly-extending cantilever tubes 42.

Each cantilever tube 42 extends rearwardly from and is in alignment with the middle tube 26 of one of the platform frames. Each cantilever tube is tiltably mounted between two rigid bracket plates 44, secured to and projecting downwardly from the sides of the middle tube 26 upon a suitable pivot bolt 43. The forward extremity of each cantilever tube 42 extends between two slotted bracket plates 45 to which it may be adjustably secured by means of an adjusting clamp bolt 46. Thus, the relative vertical angle between the middle tube 26 and the cantilever tube 42 can be adjusted by loosening the clamp bolt 46 and tilting the middle tube 26 upwardly or downwardly to the desired position, after which it may be secured by again tightening the bolt 46.

The rear extremity of each cantilever tube 42 is adjustably supported in a cross-fitting 47. The cross-fitting is provided with a transverse, square sleeve 48 through which the attachment tube 39 passes, and which may be locked in any desired position along the tube 39 by means of a suitable set screw 49. The fitting 47 is also provided with a longitudinally extending, square sleeve 50 through which one of the cantilever tubes 42 slidably extends, and in which the tube 42 may be adjustably locked by means of a second suitable set screw 51.

The forward extremity of each cantilever tube 42 is adjustably supported from the combine scoop supporting angle iron 17 by means of an offset clip plate 52 which engages over the lower flange of the supporting angle iron 17, and which can be fixedly clamped downwardly upon the flange of the angle iron 17 by means of a suitable clamp bolt 53.

Thus, it can be seen that each platform plate may be levelled and laterally adjusted to accurately align intermediate the plant rows, and longitudinally adjusted, so that it will be accurately spaced from the sickle bar 14, by suitable adjustments at the bolt 46 and the set screws 49 and 51.

To secure the attachment to the combine, it is only necessary to secure one of the hollow attachment tubes 39, with the cross-fittings 47 in place thereon, beneath the collecting scoop 10 by means of the clamp plates 40 and clamp bolts 41. The cross-fittings 47 are now brought to positions approximately mid-way between the plant rows, and the cantilever tubes 42 of the platform frames are extended rearwardly through the sleeves 50 of the cross-fittings 47 and are then lifted and drawn forwardly to engage the offset clamp plates 52 with the flange of the supporting angle iron 17. The platform plates are now brought to a level position by adjustment at 45 and 46 and secured in place. The cantilever tubes 42 are now moved forwardly or rearwardly in their sleeves 50 to properly space the rear cross angle 24 from the sickle bar, and are secured in place by means of the set screws 51. The sleeves 48 are then adjusted longitudinally along the attachment tube 39 so as to accurately space the platform plates from each other and are secured in the adjusted position by means of the set screws 49. After the above adjustments have been completed the clamp bolts 53 are tightened and the device is ready for use.

The apron plates 55 and 56 extend rearwardly over the sickle blade and rest by gravity upon the sickle blade hold-down clips 58 to provide a smooth bottom to carry the crop over the sickle. The flap members are supported upon an incline by the stop pins 35 to facilitate the entry of the stalks therebetween and to direct dropped ears onto the platform plates.

When the corn harvest has been completed, the device can be quickly and easily removed from the combine by simply loosening the set screws 51 and clamp bolts 53 and unhooking the clamp plates 52. This allows each platform plate and its supporting frame structure to be pulled forwardly from the combine as a complete unit as shown in Fig. 4. The attachment tube 39 and the cross-fittings 47 may remain in place on the combine until again needed for corn harvesting purposes. The chains 31 prevent the triangular gathering plates from dropping down on the forwardly projecting middle tube 26 when the device is being transported, erected and stored.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A corn harvesting attachment for a grain combine of the type having a crop-collecting scoop preceded by a sickle, comprising: a horizontal platform frame having a front and a rear frame member and two side frame members secured together to form an open rectangular frame; front hinges on said front frame member; rear hinges on said rear frame member; side hinges on each side frame member; a medially positioned supporting tube secured at its rear extremity to the middle of said rear frame member and extending forwardly beneath and in attached relation to said front frame member and forwardly of the latter; pivot supporting plates extending downwardly from adjacent the rear extremity of said supporting tube; a cantilever tube mounted adjacent its forward extremity on said pivot supporting plates and extending horizontally rearward from said platform frame to support the latter; a triangular frame mounted on said front hinges and extending to an apex forwardly of said front frame member; a ground-engaging runner plate secured beneath said apex to support said triangular frame; a side flap member mounted on each of said side hinges; an apron plate mounted on said rear hinge; a platform plate mounted on and covering said platform frame; a raised, three-sided, pyramid-like gathering element mounted on and covering said triangular frame; and means for attaching the rear extremity of said cantilever tube to said combine beneath the scoop thereof so that a plurality of harvesting attachments will be supported forwardly of said combine in horizontal, spaced-apart relation with the side flap members of adjacent attachments in close parallel relation and with the apron plates movably overlying said sickle.

2. A corn harvesting attachment as described in claim 1 in which the pivot supporting plates are pivotally mounted on said cantilever tube and having slotted bracket plates fixed to and extending downwardly from said supporting tube to the forward extremity of said cantilever tube forwardly of said pivot plates; and a clamp bolt passing through said cantilever tube and said slotted bracket plates for securing the former to the latter at any desired vertical position so as to preset the vertical angular relation between said cantilever tube and said supporting tube.

3. A corn harvesting attachment as described in claim 2 in which the means for attaching the rear extremity of the cantilever tube to said combine comprises: a horizontal transversely extending attachment tube; means for securing said attachment tube beneath said combine rearwardly of said sickle; an attachment fitting for securing the rear extremity of said cantilever tube to said attachment tube; and a clamp plate mounted on said cantilever tube forwardly of said fitting for attachment to said combine to support the cantilever tube in a substantially horizontal, forwardly extending position.

References Cited in the file of this patent

UNITED STATES PATENTS

| | | |
|---|---|---|
| 1,018,675 | Mueller et al. | Feb. 27, 1912 |
| 2,044,396 | Perau | June 16, 1936 |
| 2,099,471 | Edgington | Nov. 16, 1937 |
| 2,283,528 | Betz et al. | May 19, 1942 |
| 2,575,120 | Peel | Nov. 13, 1951 |
| 2,702,980 | Pitner | Mar. 1, 1955 |
| 2,765,612 | Raumaker et al. | Oct. 9, 1956 |